(12) United States Patent
Du et al.

(10) Patent No.: US 9,642,149 B2
(45) Date of Patent: May 2, 2017

(54) USER SCHEDULING METHOD, MASTER BASE STATION, USER EQUIPMENT, AND HETEROGENEOUS NETWORK

(71) Applicants: Huawei Technologies Co., Ltd., Shenzhen (CN); Fraunhofer-Gesellschaft zur Förderung der angewandten Forschung e.V., Munich (DE)

(72) Inventors: Yinggang Du, Kista (SE); Lu Rong, Shanghai (CN); Thomas Wirth, Munich (DE); Martin Kurras, Munich (DE); Lars Thiele, Munich (DE)

(73) Assignees: Huawei Technologies Co., Ltd., Shenzhen (CN); Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 205 days.

(21) Appl. No.: 14/611,704

(22) Filed: Feb. 2, 2015

(65) Prior Publication Data
US 2015/0156787 A1  Jun. 4, 2015

Related U.S. Application Data

(63) Continuation of application No. PCT/CN2013/073591, filed on Apr. 1, 2013.

(30) Foreign Application Priority Data

Aug. 2, 2012  (CN) .......................... 2012 1 0273189

(51) Int. Cl.
  *H04W 72/08* (2009.01)
  *H04W 72/12* (2009.01)
  *H04W 72/04* (2009.01)

(52) U.S. Cl.
  CPC ..... *H04W 72/082* (2013.01); *H04W 72/1231* (2013.01); *H04W 72/0426* (2013.01)

(58) Field of Classification Search
  None
  See application file for complete search history.

(56) References Cited

U.S. PATENT DOCUMENTS

2010/0322180 A1  12/2010  Kim et al.
2012/0157154 A1  6/2012  Cho et al.
(Continued)

FOREIGN PATENT DOCUMENTS

CN  102196580 A  9/2011
CN  102469583 A  5/2012
(Continued)

OTHER PUBLICATIONS

"3$^{rd}$ Generation Partnership Project; Technical Specification Group Radio Access Network; Evolved Universal Terrestrial Radio Access (E-UTRA); User Equipment (UE) Procedures in Idle Mode (Release 8)," 3GPP TS 36.304, V8.6.0, pp. 1-30, 3$^{rd}$ Generation Partnership Project, Valbonne, France (Jun. 2009).

*Primary Examiner* — Edan Orgad
*Assistant Examiner* — Saumit Shah
(74) *Attorney, Agent, or Firm* — Leydig, Voit & Mayer, Ltd.

(57) ABSTRACT

The present invention provides a user scheduling method, a master base station, a user equipment, and a heterogeneous network. The method includes: receiving, by a master base station, a downlink interference indicator DII forwarded by a serving slave base station serving a user equipment UE, where the DII is sent to the serving slave base station by the UE attached to the serving slave base station, and when the DII is greater than a preset threshold, the DII indicates that the UE is in a high DII region; determining, according to the DII, whether the UE is in a high DII region; and if the UE (Continued)

is in a high DII region, allocating, when performing scheduling, fewer resources that may interfere with the UE.

13 Claims, 5 Drawing Sheets

(56) References Cited

U.S. PATENT DOCUMENTS

| | | | | |
|---|---|---|---|---|
| 2012/0190378 A1* | 7/2012 | Han | ..................... | H04B 7/0639 |
| | | | | 455/452.2 |
| 2012/0322453 A1* | 12/2012 | Weng | .................... | H04W 72/02 |
| | | | | 455/450 |
| 2012/0327795 A1* | 12/2012 | Mallik | ................. | H04B 17/345 |
| | | | | 370/252 |
| 2013/0029670 A1* | 1/2013 | Lee | ....................... | H04W 36/08 |
| | | | | 455/444 |
| 2013/0107828 A1* | 5/2013 | Dinan | ................. | H04W 52/346 |
| | | | | 370/329 |

FOREIGN PATENT DOCUMENTS

| | | | | |
|---|---|---|---|---|
| EP | 2632217 A2 | 8/2013 | | |
| KR | WO 2011074856 A2 * | 6/2011 | ............ | H04W 36/08 |
| WO | WO 2011088465 A1 | 7/2011 | | |
| WO | WO 2011130453 A1 | 10/2011 | | |

* cited by examiner

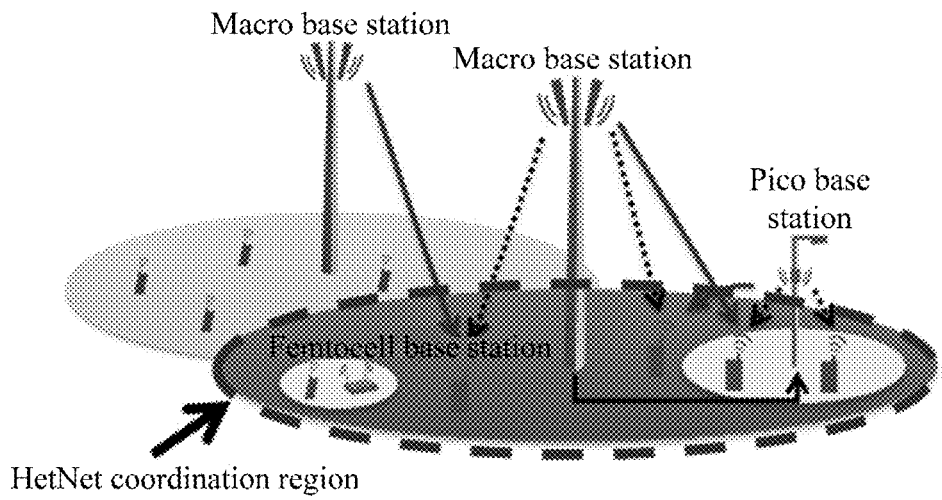

FIG. 3

```
A master base station receives a downlink interference indicator DII
forwarded by a serving slave base station serving a user equipment
UE, where the DII is sent to the serving slave base station by the UE    ─S401
   attached to the serving slave base station, and when the DII is
 greater than a preset threshold, the DII indicates that the UE is in a
                         high DII region
```

402
Determine, according to the DII, whether the
         UE is in a high DII region Yes

```
The master base station, when performing scheduling, assigns    ─S403
     fewer resources that may interfere with the UE
```

FIG. 4

USER SCHEDULING METHOD, MASTER BASE STATION, USER EQUIPMENT, AND HETEROGENEOUS NETWORK

CROSS-REFERENCE TO RELATED APPLICATION

This application is a continuation of International Patent Application No. PCT/CN2013/073591, filed on Apr. 1, 2013, which claims priority to Chinese Patent Application No. 201210273189.2, filed on Aug. 2, 2012, both of which are hereby incorporated by reference in their entireties.

TECHNICAL FIELD

The present invention relates to the field of communication technologies, and in particular, to a user scheduling method, a master base station, a user equipment (user equipment, UE), and a heterogeneous network.

BACKGROUND

The long term evolution (Long Term Evolution, LTE) R8 protocol and subsequent versions define a basic feedback mode for optimizing transmission efficiency, especially for downlink transmission, where scheduling is performed in a radio resource management (Radio Resource Management, RRM) entity according to a frequency selectivity characteristic, including modulation and coding scheme (Modulation and Coding Scheme, MCS) selection, multiple-input multiple-output (Multiple-Input Multiple-Output, MIMO) mode selection, user selection, and the like. In a heterogeneous network (Heterogeneous Network, HetNet), because interference comes from multiple interference sources such as a local macro cell, a neighboring macro cell, and other micro cells, the interference itself cannot be simply deemed as white Gaussian noise. Therefore, a feedback mechanism needs to be improved so that the interference includes, to the greatest extent, only interference information from a macro cell, thereby effectively improving the performance of the micro cell. Correspondingly, in the protocol, multiple base stations in cooperation need to be explicitly notified of an interference condition, so as to coordinate a corresponding radio resource. Because the coordination is required only for a small part of micro cells in the HetNet, it is easy for implementation. Definitely, coordination in a larger range is not excluded.

After a micro cell (including a Picocell, a Femtocell, and the like) is introduced into a macro cell, cell density is increased, which may effectively improve the coverage and increase the system capacity. Generally, in order to use a frequency resource effectively, the same frequency is used in the same macro cell. However, in this case, interference of a neighboring cell is increased naturally. As regards how to solve this problem, Table 1 shows transmit power corresponding to different types of cells.

TABLE 1

| Cell Type | Transmit Power [dBm] |
|---|---|
| Macro cell | 43 |
| Micro cell | 30 |
| Picocell | 23-30 |
| Femtocell | <23 |

FIG. 1 is a distribution diagram of a signal to interference plus noise ratio (Signal to Interference plus Noise Ratio, SINR) of a typical downlink HetNet network. The HetNet is formed by a macro base station and a micro base station, where the micro base station may be a Pico base station, a Femtocell base station, or a relay. The micro base station has small transmit power, and therefore, may be deployed more easily than the macro base station. Generally, a frequency reuse factor of an LTE system is 1, indicating that all neighboring cells transmit a signal over the same frequency resource. As a result, some macro cells receive serious interference from a neighboring macro base station or micro base station, and some micro cells receive serious interference from a macro base station that covers the micro cells. Therefore, a performance trade-off must be performed in the HetNet network.

The LTE R8 protocol defines a feedback mechanism between an eNodeB base station and a user equipment. Information exchanged between an LTE base station and a UE includes:

1. channel quality information (Channel Quality Indicator, CQI): indicating an optimal MCS;
2. a preferred matrix index (Preferred Matrix Index, PMI): indicating a preferred precoding matrix; and
3. a rank indicator (Rank Indicator, RI): indicating a rank that may be transmitted in a preferred MIMO mode.

Feedback information may be sent periodically or non-periodically, and the feedback may be full-band feedback or sub-band feedback. The feedback may use a differential mode, thereby combining full-band and sub-band characteristics, and feeding back as much information as possible without reducing feedback accuracy or with a small reduction. The protocol specifies no pilot for measuring interference. Therefore, an interference signal cannot be merely simplified into Gaussian noise. In the prior art, interference is determined mainly by using the following methods:

1. using the number of antennas or using polarization;
2. using a MIMO transmission mode, for example, space division multiple access (Space Division Multiple Access, SDMA), single user multiplexing, and the like;
3. using a downtilt angle of an antenna; and
4. using transmit power.

Based on information fed back by a UE, an RRM scheduler allocates time/frequency/space resources to a group of users. Each base station schedules a user thereof based on a scheduling policy of the base station. In the existing protocol, no scheduling information is exchanged between base stations, especially, for example, between base stations on different levels in a HetNet scenario.

In this scheduling mode, because no user scheduling information is exchanged between base stations, an interference condition after the scheduling cannot be predicted, which easily leads to a phenomenon of resource "collision". For example, base stations schedule a high MCS or high power on the same resource, resulting in very large interference between cells, which reduces throughput of the whole mobile communication system.

SUMMARY

Embodiments of the present invention provide a user scheduling method, a master base station, a user equipment, and a heterogeneous network, in order to solve the problem in the prior art that no user scheduling information is exchanged between base stations, which makes it difficult to predict an interference condition after user scheduling, results in very large interference between cells, and reduces throughput of the whole mobile communication system.

In one aspect, a user scheduling method is provided, where the method includes:

receiving, by a master base station, a downlink interference indicator (downlink interference indicator, DII) forwarded by a serving slave base station serving a user equipment UE, where the DII is sent to the serving slave base station by the UE attached to the serving slave base station, and when the DII is greater than a preset threshold, it indicates that the UE is in a high DII region;

determining, according to the DII, whether the UE is in a high DII region; and if the UE is in a high DII region, allocating, by the master base station when performing scheduling, fewer resources that interfere with the UE.

In another aspect, a master base station is provided, where the master base station includes:

a DII receiving unit, configured to receive a downlink interference indicator DII forwarded by a serving slave base station serving a user equipment UE, where the DII is sent to the serving slave base station by the UE attached to the serving slave base station, and when the DII is greater than a preset threshold, the DII indicates that the UE is in a high DII region;

a region determining unit, configured to determine, according to the DII, whether the UE is in a high DII region; and a user scheduling unit, configured to: if the UE is in a high DII region, allocate, when performing scheduling, fewer resources that may interfere with the UE.

In still another aspect, a user scheduling method is provided, where the method includes:

computing, by a user equipment, a downlink interference indicator DII, where the computing a downlink interference indicator DII specifically includes:

obtaining weighted broadband/specific sub-band CQI by computation according to a broadband primary synchronization signal received from a master base station; or obtaining the DII by computation according to interference power P_interference received from a master base station and received power P_Pni received from a slave base station; and sending the downlink interference indicator DII to the slave base station.

In yet another aspect, a user equipment is provided, where the user equipment includes:

a DII obtaining unit, configured to compute a downlink interference indicator DII, where the DII obtaining unit includes:

a first DII obtaining module, configured to obtain weighted broadband/specific sub-band channel quality information CQI by computation according to a broadband primary synchronization signal received from a master base station; or a second DII obtaining module, configured to obtain the DII by computation according to interference power P_interference received from a master base station and received power P_Pni received from a slave base station; and a DII sending unit, configured to send the downlink interference indicator DII to the slave base station.

In yet still another aspect, a heterogeneous network is provided, where the heterogeneous network includes multiple slave base stations and the master base station described above, and serial numbers of the slave base stations are assigned by the master base station.

In the embodiments of the present invention, after receiving a DII fed back by a UE, a slave base station forwards the DII to a master base station; and when the UE is in a high DII region, the master base station, actively allocates, when performing scheduling, fewer resources that may interfere with the UE attached to the slave base station, thereby reducing interference received by the UE attached to the slave base station.

BRIEF DESCRIPTION OF DRAWINGS

FIG. 3 is a schematic diagram of a HetNet coordination region according to Embodiment 1 of the present invention;

FIG. 4 is an implementation flowchart of a user scheduling method according to Embodiment 2 of the present invention;

DESCRIPTION OF EMBODIMENTS

To make the objectives, technical solutions, and advantages of the present invention more comprehensible, the following further describes the present invention in detail with reference to the accompanying drawings and embodiments. It is understandable that the specific embodiment is only used to explain the present invention and is not intended to limit the present invention.

In the embodiments of the present invention, a UE attached to a slave base station sends a DII obtained by computation to the slave base station; after receiving the DII, the slave base station forwards the DII to a master base station; when the UE is in a high DII region, the master base station allocates, when performing scheduling, fewer resources that may interfere with the UE attached to the slave base station, thereby reducing interference received by the UE served by the slave base station.

The implementation of the present invention is described in detail with reference to specific embodiments.

Embodiment 1

A HetNet network architecture is an effective manner for improving coverage and capacity in a cellular network. Under the existing architecture, an interface such as X2 is defined between nodes of a HetNet network. The nodes may exchange some information by using such an interface for some coordination operations. In order to handle interference between the nodes, on the basis described above, the present invention defines a novel feedback mechanism, so that interference between nodes in the HetNet is coordinated and each node independently schedules a user equipment, thereby achieving the objective of improving coverage and increasing throughput while the complexity is slightly increased.

Figure 1:
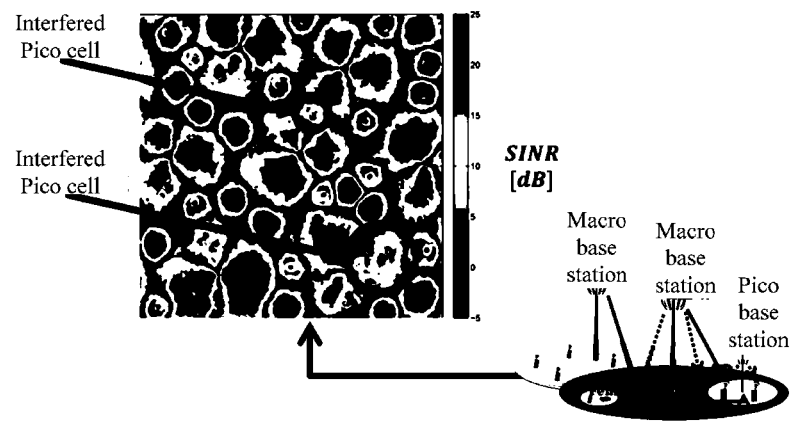
FIG. 1 is a schematic distribution diagram of a SINR of a typical downlink HetNet network.
Figure 2:
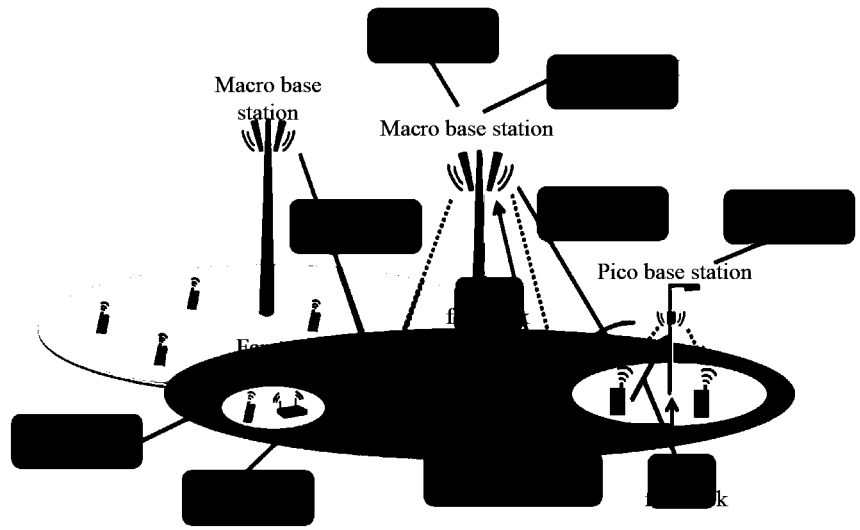
FIG. 2 is a schematic structural diagram of a HetNet network according to Embodiment 1 of the present invention.

FIG. 2 is a schematic structural diagram of a HetNet network according to Embodiment 1 of the present invention. For the convenience of description, only a part related to the embodiment of the present invention is illustrated, and is described in detail as follows:

In the embodiment, a HetNet network is divided into a master base station and slave base stations, providing a master base station-slave base station architecture. A master base station is a HetNet master node marked in FIG. 2, and a slave base station is a HetNet slave node marked in FIG. 2. Each slave base station may be numbered by the master base station for a distinguishing purpose. Obviously, some reserved UE IDs may be allocated to the slave base stations, or some cell identifiers may be reserved at each master base station and allocated to the micro cells directly.

As described above, a HetNet region includes a macro base station and a group of low-power nodes. A low-power node may be any node whose transmit power is smaller than that of the macro base station, such as a Pico base station, a Femtocell base station, and a Relay. The present invention focuses on a scenario where multiple low-power nodes are located in the same macro cell, the low-power nodes attach to the macro base station, and all HetNet entities (nodes) together form a HetNet coordination region, that is, the HetNet coordination region illustrated in FIG. 3. It should be noted that in the coordination region, each node performs independent scheduling. It should be noted that in the embodiment of the present invention, when a master base station is a macro base station, a slave base station is a group of low-power nodes; and when a master base station is a low-power node, a slave base station is a macro base station and/or another low-power node.

Embodiment 2

FIG. 4 is an implementation process of a user scheduling method according to Embodiment 2 of the present invention, which is described in detail as follows:

In step S401, a master base station receives a downlink interference indicator DII forwarded by a serving slave base station serving a user equipment UE, where the DII is sent to the serving slave base station by the UE attached to the serving slave base station, and when the DII is greater than a preset threshold, the DII indicates that the UE is in a high DII region.

In the embodiment, the master base station receives the DII forwarded by the slave base station, where the UE attached to the slave base station receives strong interference from the master base station or receives strongest interference from the master base station. In order to improve the performance, the UE served by the slave base station computes a DII, and feeds back the DII to the slave base station, and the slave base station forwards the DII to the master base station, where the DII indicates the strength of interference received by the UE from the master base station.

Similarly, when a UE attached to the master base station receives serious interference from another slave base station, the UE served by the master base station computes a DII and feeds back the DII to the master base station, and the master base station forwards the DII to the slave base station.

The master base station may be a macro base station or a low-power node PN, such as a Pico base station, a Femtocell base station, and a Relay. When the master base station is a macro base station, the slave base station is a low-power node PN, such as a Pico base station, a Femtocell base station, and a Relay; when the master base station is a low-power node, such as a Pico base station, a Femtocell base station, and a Relay, the slave base station is a macro base station and/or another low-power node. In the embodiment, for the convenience of description, an example is described where the master base station is a macro base station, a slave base station is a low-power node PN, and a user equipment UE served by the PN receives greatest interference from the master base station. A similar method may also be used to compute a DII of interference from another slave base station.

Specifically, a method for a UE to obtain a DII by computation according to interference power P_interference received from a master base station and received power P_Pni received from a slave base station is:

Step 1: Compute interference power P_interference received from the master base station.

Step 2: Compute received power P_PNi received from the slave base station.

Step 3: Compute a ratio of the interference power to the received power.

Step 4: Quantize the ratio to obtain the DII, where in the embodiment, the DII is represented by using two bits.

After the ratio is quantized, 2-bit information is obtained, where the 2-bit information may be explained as classifying interference into extremely strong interference, strong interference, common interference, and small interference. That is, DII={0, 1, 2, 3}, where 0, 1, 2, and 3 respectively represent small interference, common interference, strong interference, and extremely strong interference. Definitely, interference levels may also be represented by using any other number of bits.

It should be noted that if only the interference from the master base station is considered, no interfering base station identification mark needs to be fed back when the DII is fed back; if interference from another slave base station is also considered, a corresponding base station identification mark also needs to be fed back. A specific feedback manner may be explicit or implicit, where the explicit feedback refers to specifically feeding back a serial number of the base station or an identifier configured by the master base station, and the implicit feedback refers to feeding back only a DII of one interfering base station or DIIs of multiple interfering base stations sequentially at a time point according to a specific rule, without particularly specifying a specific identification mark of the interfering base stations.

Therefore, when the interference from another slave base station is also considered, the master base station first needs to obtain, according to a DII fed back by the slave base station and a base station identifier of the DII, an identifier of a base station that causes greatest interference to the UE; and then determine, according to the base station identifier, whether the base station that causes greatest interference to the UE is the master base station or an interfering slave base station. The interfering slave base station is another slave base station other than a serving slave base station. If the UE receives greatest interference from the master base station, when the UE is in a high DII region the master base station allocates, when performing scheduling, fewer resources that may interfere with the UE; if the UE receives greatest interference from the interfering slave base station, when the UE is in a high DII region, the master base station forwards the DII to the corresponding interfering slave base station according to the base station identifier, thereby instructing the interfering slave base station to allocate, when performing scheduling, fewer resources that may interfere with the UE.

An existing feedback mechanism may be referenced for a DII format: 1) a bandwidth involved by a DII, including a sub-band DII and a broadband/full-band DII;

2) granularity for feeding back a DII: including full feedback and differential feedback, where two bits are used to represent a state including {0, 1, 2, 3}, or one bit is used to represent increasing or decreasing of DII information;

3) top-m or worst-m (m strongest or weakest) interference sources: the UE feeds back only m strongest interference sources or m weakest interference sources, where the interference source may refer to the master base station and/or another slave base station;

4) top-m or worst-m (m most interfered or least interfered) sub-bands or frequency bands: when m most interfered sub-bands or frequency bands are fed back, it indicates that the UE expects a corresponding interfering base station not to schedule, to the greatest extent, a resource in the m sub-bands or frequency bands, thereby avoiding interference; and when m least interfered sub-bands or frequency bands are fed back, it indicates that the UE almost receives no interference or receives least interference in the m sub-bands or frequency bands, and therefore another base station may schedule a resource in the m sub-bands or frequency bands; and 5) an update frequency of DII feedback: periodically (several milliseconds or several seconds) or non-periodically (triggered by a UE, triggered by a base station, or triggered by a master base station of a HetNet coordination region).

Specifically, another method for a UE to compute a DII takes a broadband CQI into consideration, where the DII is defined as a weighted broadband/specific sub-band CQI value obtained by computation according to a broadband primary synchronization signal received from another base station. Because base stations use different synchronization sequences (that is, synchronization signals), a base station causing greatest interference and interference strength may be determined according to a CQI value obtained by computation according to different sequences, thereby representing the interference received by the UE. That is, the UE needs to compute DII values from multiple interfering base stations.

In addition, it should be noted that, in order to save resources, when the master base station only needs to schedule a UE that receives greatest interference, the master base station uses a policy of allocating fewer or even no resources that may interfere with the UE. Therefore, as an exemplary embodiment of the present invention, a UE that computes and feeds back a DII is a UE that receives greatest interference from the master base station and whose service is most seriously affected. Specifically, according to the following two conditions, the master base station may search for the UE that receives greatest interference:

Condition 1: Search, according to a preset frequency spectrum efficiency threshold $S_{PN_i}$, for a UE served by an $i^{th}$ slave base station $PN_i$ and having frequency spectrum efficiency lower than the frequency spectrum efficiency threshold $S_{PN_i}$, to find the UE that receives greatest interference from the master base station.

Condition 2: Search, according to a preset received power threshold $P_{PN_i}$, for a UE served by the $i^{th}$ slave base station $PN_i$ and having received power greater than the received power threshold $P_{PN_i}$, to find the UE that receives greatest interference from the master base station.

If the found UE satisfies the two conditions at the same time, it indicates that the UE is the UE that receives greatest interference from the master base station. In other words, according to the received power, the UE is supposed to have higher frequency spectrum efficiency, that is, a higher MCS, when having a higher Signal Noise Ratio (Signal Noise Ratio, SNR); however, the actual frequency spectrum efficiency thereof is smaller than the preset frequency spectrum efficiency threshold (with respect to condition 1, the threshold herein may also be an MCS threshold, an SINR threshold, and the like). Obviously, the reason is that the UE receives strong interference.

In step S402, whether the UE is in a high DII region is determined according to the DII.

In the embodiment, the DII is 2-bit information, where the 2-bit information may be explained as classifying interference into extremely strong interference, strong interference, common interference, and small interference. That is, DII={0, 1, 2, 3}, where 0, 1, 2, and 3 respectively represent small interference, common interference, strong interference, and extremely strong interference. Definitely, interference levels may also be represented by using any other number of bits. In the embodiment, when the DII is greater than or equal to 2, it indicates that the UE is in a high DII region.

In step S403, if the UE is in a high DII region, the master base station allocates, when performing scheduling, fewer resources that may interfere with the UE.

In the embodiment, if the UE is in a high DII region, the master base station may correspondingly allocate, when performing scheduling, fewer resources that may interfere with the UE served by the slave base station, thereby reducing the interference received from the master base station by the UE served by the slave base station. For example, if the UE is in a high DII region, the following three manners may be used to allocate fewer resources that may interfere with the UE. 1. The master base station may send a blank subframe to mute the resources that may interfere with the UE, thereby ensuring that no interference is caused to the UE served by the slave base station. 2. The master base station may select to offload a part of UEs to the slave base station, to ensure fairness in user scheduling, where the UEs to be offloaded to the slave base station are determined by using a range extension method. Specifically, in the HetNet, there is a method for determining, according to a range extension (Range Extension, RE), whether a user accesses the master base station or the slave base station, that is, when a user determines to access the master base station or the slave base station, a threshold that allows the UE to still access the slave base station under the circumstance where reference signal received power (Reference Signal Received Power, RSRP) of the slave base station is smaller than RSRP of the master base station by a specific value (that is, an RE value); and by dynamically adjusting the RE value, a proportion of users accessing a micro base station may be adjusted. For example, when the master base station is heavily loaded, the RE value may be larger, for example, be increased from 6 dB to 12 dB, thereby increasing users accessing the slave base station, which is referred to as "offloading"; and when the master base station is lightly loaded, the RE value may be smaller. In the embodiment, by using this principle, a proportion of users accessing the master base station and the slave base station may be adjusted by adjusting the RE threshold. 3. The master base station may also reduce transmit power by using a power adjustment method, to reduce interference with the UE in the low-power PN, so that the operation is more efficient.

In addition, after the DII is forwarded to a mobility management entity (Mobility Management Entity, MME) of an evolved packet core (Evolved Packet Core, EPC), node switching selection may also be facilitated.

In the embodiment, after the master base station receives the downlink interference indicator DII fed back by the slave base station, when the UE is in a high DII region, the master base station allocates, when performing scheduling, fewer resources that may interfere with the UE attached to the slave base station, thereby reducing the interference received from the master base station by the UE served by the slave base station.

Embodiment 3

Figure 5:
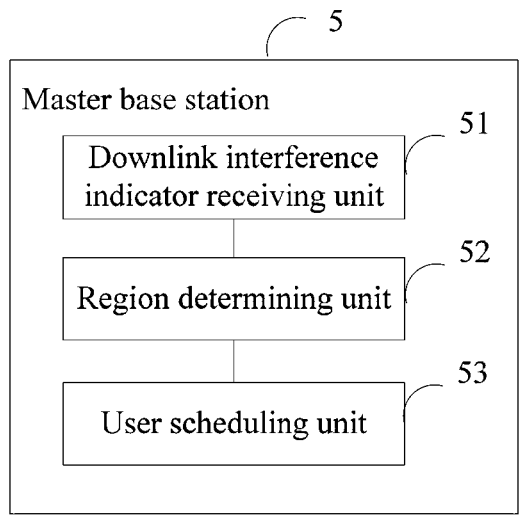
FIG. 5 is a structural block diagram of a master base station according to Embodiment 3 of the present invention.

FIG. 5 is a structural block diagram of a master base station according to Embodiment 3 of the present invention. For the convenience of description, only a part related to the embodiment of the present invention is illustrated. In the embodiment, the master base station 5 includes a downlink interference indicator receiving unit 51, a region determining unit 52, and a user scheduling unit 53.

The downlink interference indicator receiving unit 51 is configured to receive a downlink interference indicator DII forwarded by a serving slave base station serving a user equipment UE, where the DII is sent to the serving slave base station by the UE attached to the serving slave base station, and when the DII is greater than a preset threshold, the DII indicates that the UE is in a high DII region.

The region determining unit 52 is configured to determine, according to the DII, whether the UE is in a high DII region.

The user scheduling unit 53 is configured to: if the UE is in a high DII region, allocate, when performing scheduling, fewer resources that may interfere with the UE.

Furthermore, the user scheduling unit 53 includes: a first scheduling module, a second scheduling module, and a third scheduling module. The first scheduling module is configured to send a blank subframe to mute the resources that may interfere with the UE.

The second scheduling module is configured to offload a part of UEs to a slave base station, to ensure fairness in user scheduling, where the UEs to be offloaded to the slave base station are determined by using a range extension method.

The third scheduling module is configured to reduce transmit power by using a power adjustment method.

As another embodiment of the present invention, the master base station further includes a first UE searching unit, a second UE searching unit, and an interference determining unit.

The first UE searching unit is configured to search, according to a preset frequency spectrum efficiency threshold $S_{PN_i}$, for a UE served by an $i^{th}$ slave base station $PN_i$ and having frequency spectrum efficiency lower than the frequency spectrum efficiency threshold $S_{PN_i}$, to find the UE that receives greatest interference from the master base station.

The second UE searching unit is configured to search, according to a preset received power threshold $P_{PN_i}$, for a UE served by the $i^{th}$ slave base station $PN_i$ and having received power greater than the received power threshold $P_{PN_i}$, to find the UE that receives greatest interference from the master base station.

The interference determining unit is configured to: if the found UE satisfies the two conditions at the same time, perform the allocating, when the UE is in a high DII region, by the master base station when performing scheduling, fewer resources that may interfere with the UE.

Embodiment 4

Figure 6:
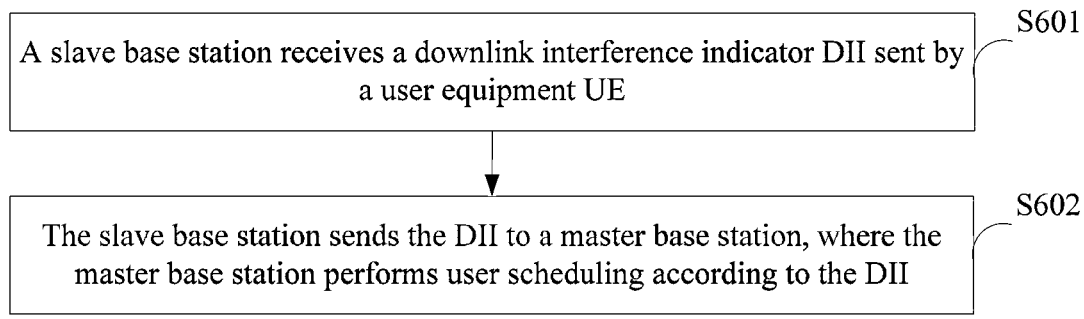
FIG. 6 is an implementation flowchart of a user scheduling method according to Embodiment 4 of the present invention.

FIG. 6 is an implementation process of a user scheduling method according to Embodiment 4 of the present invention, which is described in detail as follows:

In step S601, a slave base station receives a downlink interference indicator DII sent by a user equipment UE.

In step S602, the slave base station sends the DII to a master base station, where the master base station performs user scheduling according to the DII.

Embodiment 5

Figure 7:
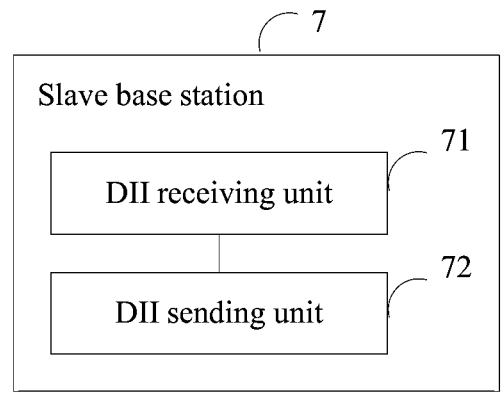
FIG. 7 is a structural block diagram of a slave base station according to Embodiment 5 of the present invention.

FIG. 7 is a structural block diagram of a slave base station according to Embodiment 5 of the present invention. For the convenience of description, only a part related to the embodiment of the present invention is illustrated. In the embodiment, the slave base station 7 includes a DII receiving unit 71 and a DII sending unit 72.

The DII receiving unit 71 is configured to receive a downlink interference indicator DII sent by a user equipment UE.

The DII sending unit 72 is configured to send the DII to a master base station, where the master base station performs user scheduling according to the DII.

Embodiment 6

Figure 8:
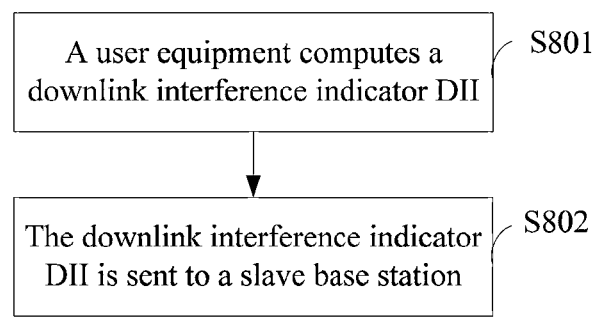
FIG. 8 is an implementation flowchart of a user scheduling method according to Embodiment 6 of the present invention.

FIG. 8 is an implementation process of a user scheduling method according to Embodiment 6 of the present invention, which is described in detail as follows:

In step 801, a user equipment computes a downlink interference indicator DII.

In the embodiment, the user equipment UE may obtain a weighted broadband/specific sub-band channel quality information CQI by computation according to a broadband primary synchronization signal received from a master base station, and use the CQI as the downlink interference indicator DII; or obtain a DII by computation according to interference power P_interference received from the master base station and received power P_Pni received from a slave base station. Description in Embodiment 2 may be referenced for steps of obtaining the DII by computation according to the interference power P_interference received from the master base station and the received power P_Pni received from the slave base station, and details are omitted herein.

In step 802, the downlink interference indicator DII is sent to the slave base station.

Embodiment 7

Figure 9:
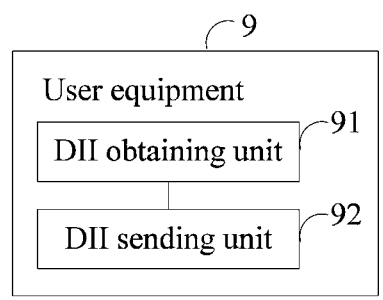
FIG. 9 is a structural block diagram of a user equipment according to Embodiment 7 of the present invention.

FIG. 9 is a structural block diagram of a user equipment according to Embodiment 7 of the present invention. For the convenience of description, only a part related to the embodiment of the present invention is illustrated. In the embodiment, the user equipment 9 includes a DII obtaining unit 91 and a DII sending unit 92.

The DII obtaining unit 91 is configured to compute a downlink interference indicator DII.

The DII sending unit 92 is configured to send the downlink interference indicator DII to a slave base station.

Furthermore, the DII obtaining unit 91 includes a first DII obtaining module, where the first DII obtaining module is configured to obtain weighted broadband/specific sub-band channel quality information CQI by computation according to a broadband primary synchronization signal received from a master base station.

Furthermore, the DII obtaining unit 91 further includes a second DII obtaining module, where the second DII obtaining module is configured to obtain a DII by computation according to interference power P_interference received from the master base station and received power P_Pni received from the slave base station.

Furthermore, the second DII obtaining module includes an interference power obtaining submodule, a received power obtaining submodule, a ratio obtaining submodule, and a quantizing submodule.

The interference power obtaining submodule is configured to compute interference power P_interference received from the master base station.

The received power obtaining submodule is configured to compute received power P_PNi received from the slave base station.

The ratio obtaining submodule is configured to compute a ratio ramda of the interference power to the received power.

The quantizing submodule is configured to quantize the ratio to obtain the corresponding DII.

Furthermore, the DII obtaining unit 91 further includes a third DII obtaining module, where the third DII obtaining module is configured to obtain a DII by computation according to interference power P_interference_j received from another slave base station and received power P_Pni received from a serving slave base station, where j is a sequence number of the another slave base station.

Furthermore, the third DII obtaining module includes an interference power obtaining submodule, a received power obtaining submodule, a ratio obtaining submodule, and a quantizing submodule.

The interference power obtaining submodule is configured to compute interference power P_interference_j received from the another slave base station.

The received power obtaining submodule is configured to compute received power P_PNi received from the slave base station.

The ratio obtaining submodule is configured to compute a ratio ramda of the interference power to the received power.

The quantizing submodule is configured to quantize the ratio to obtain the corresponding DII.

Embodiment 8

Figure 10:
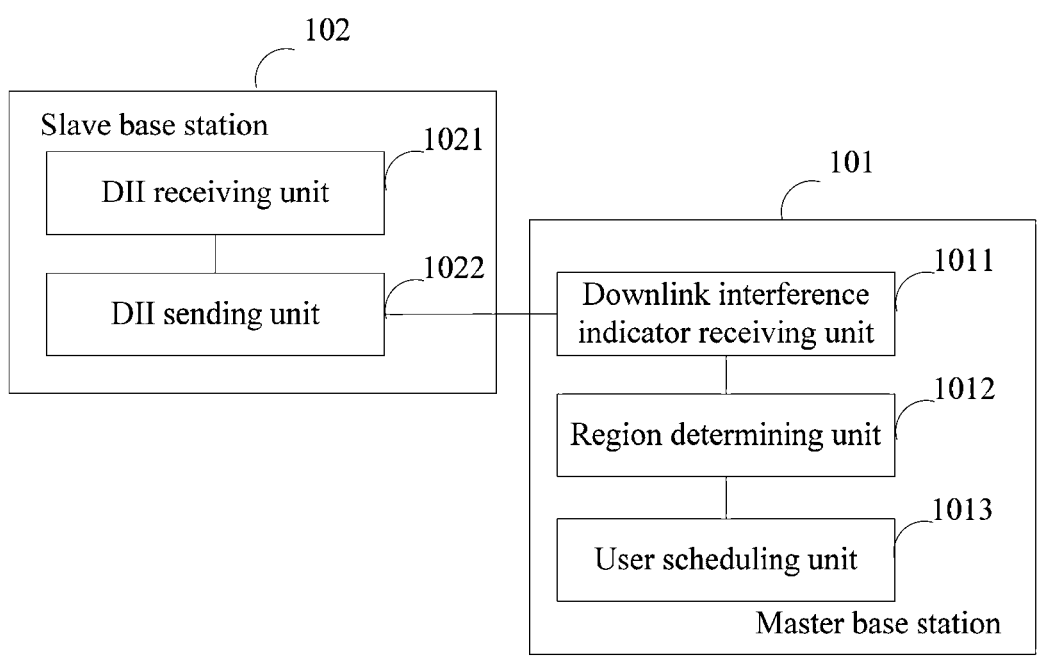
FIG. 10 is a structural block diagram of a heterogeneous network according to Embodiment 8 of the present invention.

FIG. 10 is a structural block diagram of a heterogeneous network according to Embodiment 8 of the present invention. For the convenience of description, only a part related to the embodiment of the present invention is illustrated. In the embodiment, the heterogeneous network 10 includes a master base station 101 and at least one slave base station 102, where the master base station 101 includes a downlink interference indicator receiving unit 1011, a region determining unit 1012, and a user scheduling unit 1013.

The downlink interference indicator receiving unit 1011 is configured to receive a downlink interference indicator DII forwarded by a serving slave base station serving a user equipment UE, where the DII is sent to the serving slave base station by the UE attached to the serving slave base station, and when the DII is greater than a preset threshold, the DII indicates that the UE is in a high DII region.

The region determining unit 1012 is configured to determine, according to the DII, whether the UE is in a high DII region.

The user scheduling unit 1013 is configured to: if the UE is in a high DII region, allocate, when performing scheduling, fewer resources that may interfere with the UE.

Furthermore, the user scheduling unit 1013 includes a first scheduling module, a second scheduling module, and a third scheduling module. The first scheduling module is configured to send a blank subframe to mute the resources that may interfere with the UE.

The second scheduling module is configured to offload a part of UEs to a slave base station, to ensure fairness in user scheduling, where the UEs to be offloaded to the slave base station are determined by using a range extension method.

The third scheduling module is configured to reduce transmit power by using a power adjustment method.

As another embodiment of the present invention, the master base station further includes a first UE searching unit, a second UE searching unit, and an interference determining unit.

The first UE searching unit is configured to search, according to a preset frequency spectrum efficiency threshold $S_{PN_i}$, for a UE served by an $i^{th}$ slave base station $PN_i$ and having frequency spectrum efficiency lower than the frequency spectrum efficiency threshold $S_{PN_i}$, to find the UE that receives greatest interference from the master base station.

The second UE searching unit is configured to search, according to a preset received power threshold $P_{PN_i}$, for a UE served by the $i^{th}$ slave base station $PN_i$ and having received power greater than the received power threshold $P_{PN_i}$, to find the UE that receives greatest interference from the master base station.

The interference determining unit is configured to: if the found UE satisfies the two conditions at the same time, perform the allocating, when the UE is in a high DII region, by the master base station when performing scheduling, fewer resources that may interfere with the UE.

The slave base station 102 includes a DII receiving unit 1021 and a DII sending unit 1022.

The DII receiving unit 1021 is configured to receive a downlink interference indicator DII sent by a user equipment UE.

The DII sending unit 1022 is configured to send the DII to a master base station, where the master base station performs user scheduling according to the DII.

It should be noted that in the above embodiments, units included are divided according to functional logic, but are not limited to the above division as long as corresponding functions are implemented. In addition, specific names of the functional units are only for differentiating the functional units and are not used to limit protection scope of the present invention.

Moreover, a person of ordinary skill in the art may understand that all or part of the steps of the foregoing method in the embodiments may be implemented by a program instructing relevant hardware. The corresponding program may be stored in a computer readable storage medium, such as a ROM/RAM, a magnetic disk, or an optical disk.

The above are merely exemplary embodiments of the present invention. However, the present invention is not limited thereto. All modifications, equivalent replacements, and improvements made without departing from the spirit and principle of the present invention shall fall within the protection scope of the present invention.

What is claimed is:

1. A user equipment scheduling method, comprising:
   receiving, by a master base station, a downlink interference indicator (DII) from a serving slave base station corresponding to a user equipment (UE), and receiving a base station identifier corresponding to the DII;
   determining, by the master base station, based on the DII being greater than a preset threshold, that the UE is in a high downlink interference region;
   obtaining, by the master base station, according to the DII, an identifier of a base station that causes greatest interference to the UE;
   determining, according to the identifier of the base station that causes greatest interference to the UE, whether the master base station or an interfering slave base station causes greatest interference to the UE, wherein the interfering slave base station is another slave base station other than the serving slave base station; and
   allocating, by the master base station, in response to determining that the UE is in a high downlink interference region and in response to determining that the master base station causes greatest interference to the UE, fewer resources that may interfere with the UE when performing scheduling.

2. The method according to claim 1, wherein the allocating further comprises:
   sending a blank subframe to mute resources that may interfere with the UE.

3. The method according to claim 1, wherein the method further comprises:
   searching, by the master base station, for a UE served by an $i^{th}$ slave base station $PN_i$ having frequency spectrum efficiency lower than a frequency spectrum efficiency threshold $S_{PN_i}$, and searching, by the master base station, for a UE served by the $i^{th}$ slave base station $PN_i$ having received power greater than a received power threshold $P_{PN_i}$, to determine a UE that receives greatest interference from the master base station;
   wherein the UE to which the DII corresponds is the UE that is determined as receiving the greatest interference from the master base station.

4. The method according to claim 1, wherein the allocating further comprises:
   offloading UEs to a slave base station, wherein the offloaded UEs are selected based on a range extension method.

5. The method according to claim 1, wherein the allocating further comprises:
   reducing transmit power based on a power adjustment method.

6. A master base station, wherein the master base station comprises a processor and a non-transitory processor-readable medium having processor-executable instructions stored thereon, the processor-executable instructions, when executed by the processor, facilitating performance of the following:
   receiving a downlink interference indicator (DII) from a serving slave base station serving a user equipment (UE), and receiving a base station identifier corresponding to the DII;
   determining whether the UE is in a high downlink interference region based on whether the DII is greater than a preset threshold;
   obtaining, according to the DII, an identifier of a base station that causes greatest interference to the UE;
   determining, according to the identifier of the base station that causes greatest interference to the UE, whether the master base station or an interfering slave base station causes greatest interference to the UE, wherein the interfering slave base station is another slave base station other than the serving slave base station; and
   allocating, based on the UE being in a high downlink interference region and the master base station being the base station that causes greatest interference, fewer resources that may interfere with the UE when performing scheduling.

7. The master base station according to claim 6, wherein the allocating further comprises:
   sending a blank subframe to mute resources that may interfere with the UE.

8. The master base station according to claim 6, wherein the processor-executable instructions, when executed, further facilitate:
   offloading UEs to a slave base station, wherein the offloaded UEs are selected based on a range extension method.

9. The master base station according to claim 6, wherein the processor-executable instructions, when executed, further facilitate:
   reducing transmit power based on a power adjustment method.

10. The master base station according to claim 6, wherein the processor-executable instructions, when executed, further facilitate:
    searching for a UE served by an $i^{th}$ slave base station $PN_i$ and having frequency spectrum efficiency lower than a frequency spectrum efficiency threshold;
    searching for a UE served by the $i^{th}$ slave base station $PN_i$ and having received power greater than a received power threshold $P_{PN_i}$; and
    if a UE is found to satisfy conditions of both the first UE searching unit and the second UE searching unit, triggering the allocation of fewer resources.

11. A heterogeneous network, comprising:
    multiple slave base stations; and
    the master base station according to claim 6;
    wherein the master base station is further configured to assign serial numbers to the multiple slave base stations.

12. A user equipment scheduling method, comprising:
    receiving, by a master base station, a downlink interference indicator (DII) from a serving slave base station corresponding to a user equipment (UE), and receiving a base station identifier corresponding to the DII;
    determining, by the master base station, based on the DII being greater than a preset threshold, that the UE is in a high downlink interference region;
    obtaining, by the master base station, according to the DII, an identifier of a base station that causes greatest interference to the UE;
    determining, according to the identifier of the base station that causes greatest interference to the UE, whether the master base station or an interfering slave base station causes greatest interference to the UE, wherein the interfering slave base station is another slave base station other than the serving slave base station; and
    forwarding, by the master base station, in response to determining that the UE is in a high downlink interference region and in response to determining that the interfering slave base station causes greatest interference to the UE, the DII to the interfering slave base station to instruct the interfering slave base station to allocate fewer resources that may interfere with the UE when performing scheduling.

13. A master base station, wherein the master base station comprises a processor and a non-transitory processor-readable medium having processor-executable instructions stored thereon, the processor-executable instructions, when executed by the processor, facilitating performance of the following:
- receiving a downlink interference indicator (DII) from a serving slave base station serving a user equipment (UE), and receiving a base station identifier corresponding to the DII;
- determining whether the UE is in a high downlink interference region based on whether the DII is greater than a preset threshold;
- obtaining, according to the DII, an identifier of a base station that causes greatest interference to the UE;
- determining, according to the identifier of the base station that causes greatest interference to the UE, whether the master base station or an interfering slave base station causes greatest interference to the UE, wherein the interfering slave base station is another slave base station other than the serving slave base station; and
- forwarding, based on the UE being in a high downlink interference region and the interfering slave base station being the base station that causes greatest interference to the UE, the DII to the interfering slave base station to instruct the interfering slave base station to allocate fewer resources that may interfere with the UE when performing scheduling.

* * * * *